United States Patent [19]
Andel et al.

[11] Patent Number: 5,984,148
[45] Date of Patent: Nov. 16, 1999

[54] SELF-CLEANING PRESSURE RELIEF AND BYPASS VALVE, DISPENSING APPARATUS AND METHOD

[75] Inventors: Dave Andel, Lawrenceville; John Walsh, Duluth, both of Ga.

[73] Assignee: Nordson Corporation, Westlake, Ohio

[21] Appl. No.: 09/158,303

[22] Filed: Sep. 22, 1998

[51] Int. Cl.⁶ .................................................. B65D 88/54
[52] U.S. Cl. ........................ 222/318; 222/148; 137/238
[58] Field of Search .................................... 222/318, 424, 222/148, 109; 137/237, 473, 238, 539, 539.5, 454.5, 115.216, 115.28

[56] References Cited

U.S. PATENT DOCUMENTS

| | | | |
|---|---|---|---|
| 3,115,894 | 12/1963 | Marx | 137/576 |
| 3,474,816 | 10/1969 | Burgess | 137/238 |
| 4,360,132 | 11/1982 | Vilagi et al. | 222/504 |
| 4,565,217 | 1/1986 | McIntyre | 137/625.5 |
| 4,657,047 | 4/1987 | Kolibas | 137/881 |
| 4,932,424 | 6/1990 | Taylor | 137/539.5 |
| 5,289,810 | 3/1994 | Bauer et al. | 123/510 |
| 5,715,864 | 2/1998 | Andel et al. | 137/563 |
| 5,775,360 | 7/1998 | Hayashi et al. | 137/539.5 |

*Primary Examiner*—David J. Walczak
*Attorney, Agent, or Firm*—Wood, Herron & Evans, L.L.P.

[57] ABSTRACT

Liquid dispensing apparatus and methods for dispensing pressurized liquid including the use of a pressure relief and bypass valve. The liquid dispensing apparatus may include a pump operatively connected to a liquid reservoir and one or more liquid dispensers. A pressure relief and bypass valve is generally connected between an outlet of the pump and the liquid dispenser for providing both a pressure relief function and a bypass cleaning or flushing function. The bypass function helps prevent contaminants from lodging or accumulating within the valve.

30 Claims, 4 Drawing Sheets

SELF-CLEANING PRESSURE RELIEF AND BYPASS VALVE, DISPENSING APPARATUS AND METHOD

FIELD OF THE INVENTION

The present invention generally relates to liquid dispensing apparatus of the type using pressure relief valves and, more specifically, to hot melt adhesive dispensing systems using such valves typically in a recirculation loop.

BACKGROUND OF THE INVENTION

Many liquid dispensing systems and apparatus utilize various forms of recirculation to ensure that there is constant liquid flow and pressure in the system whether a dispensing operation is on or off. For example, in hot melt adhesive dispensing units a manifold having a series of liquid flow passages is typically connected for communication between a pump and reservoir unit and a series of dispensing nozzles or guns. To provide for pressure relief in the event of an undesirable elevated liquid pressure in the system, a pressure relief valve is often incorporated into the manifold. This pressure relief valve has taken the form of a conventional valve member that is biased to a normally-closed position using a coil spring. In the event of a predetermined, elevated pressure in the system, the valve member is lifted from the seat and pressurized liquid, such as hot melt adhesive, can flow through the valve, including through the coil spring contained therein, and be directed back into the liquid reservoir.

A problem which has arisen with typical pressure relief valves is that various contaminants, such as charred adhesive, can become lodged within the pressure relief valve and can cause it to malfunction. Also, such pressure relief valves typically are not activated very often and, therefore, problems may exist in their operation due to the presence of stagnated liquid such as adhesive which may harden-up or cure. To solve these and other problems in this area, it would be desirable to provide a pressure relief valve which is efficiently and automatically cleaned or flushed during operation of a dispensing apparatus.

SUMMARY OF THE INVENTION

The present invention overcomes the foregoing and other shortcomings of previous liquid dispensing systems and methods using pressure relief valves. While the invention will be described in connection with certain preferred features of one type of dispensing apparatus, it will be understood that the invention is not limited to the specific features detailed herein. On the contrary, the invention includes all alternatives, modifications and equivalents as may be included within the spirit and scope of the present invention.

The present invention generally relates to liquid dispensing apparatus for dispensing pressurized liquid, such as hot melt adhesive. The apparatus typically includes a pump having an inlet and an outlet, a liquid reservoir having an outlet in communication with the inlet of the pump and a liquid dispenser having an inlet in communication with the outlet of the pump and a liquid discharge outlet for discharging the liquid generally onto a substrate. In accordance with the present invention, a pressure relief and bypass valve is provided having a pressure relief inlet, a bypass inlet, and at least one outlet. The pressure relief inlet and the bypass inlet are each connected for liquid communication with the outlet of the pump and the pressure relief inlet includes a normally-closed valve member which is movable to an open position in the event of an elevated liquid pressure condition. The bypass inlet is open to allow liquid flow through the pressure relief and bypass valve to the outlet during normal operation of the pump.

The liquid dispenser, for example, may comprise a manifold having a plurality of dispensing outlets. These outlets may be connected directly or indirectly to a series of dispensing nozzles. For example, as is conventional, a plurality of dispensing guns may be connected for liquid communication with the outlets of the manifold and these dispensing guns may include various types of nozzles. The pressure relief and bypass valve is preferably mounted within the manifold and the pressure relief inlet and bypass inlet are in liquid communication with the dispensing outlets. More preferably, the pressure relief and bypass valve is mounted such that the outlet is in liquid communication with the reservoir. For example, the manifold may be connected directly to a bottom wall of the reservoir and the pressure relief and bypass valve may extend through the reservoir wall with its outlet or outlets in liquid communication with the interior of the reservoir. The pump may be a hot melt adhesive pump and the manifold, in this case, preferably includes a heat exchanger for maintaining the hot melt adhesive at an elevated temperature.

The bypass inlet of the pressure relief and bypass valve can be advantageously located between the pressure relief inlet and the outlet. The pressure relief and bypass valve includes a coil spring which maintains the valve member in a normally-closed condition against the liquid discharge outlet. The spring is disposed in a passage of the valve communicating between the pressure relief and bypass inlets and the outlet. Thus, liquid continuously enters the bypass inlet and may flow through the length of the spring and the main passage to the outlet and finally into the reservoir to continuously flush and clean the interior of the valve.

Also in accordance with the invention, a control valve is operatively connected between the bypass inlet of the pressure relief and bypass valve and the outlet of the liquid dispenser. This pressure control valve is adjustable to control liquid flow through the liquid dispenser outlet relative to liquid flow into the bypass inlet. For example, this control valve may simply be a needle valve and, when additional flow and/or pressure is required at the dispenser outlet or outlets, then this control valve is moved closer to a closed position. On the other hand, when less flow and/or pressure is required at the liquid dispenser outlet or outlets, then this control valve may be adjusted to a more open position to allow additional flow and pressure through the bypass inlet of the pressure relief and bypass valve and less flow and pressure.

The pressure relief and bypass valve preferably includes at least two bypass inlets and at least two outlets to assure free flow through the valve. When the pressure relief and bypass valve is mounted directly within a manifold, a liquid distribution spool may be connected between the manifold and the bypass inlets. This spool includes a plurality of generally radial liquid passages for distributing liquid from the manifold to the bypass inlets.

The invention further contemplates the provision of a pressure relief and bypass valve as generally described above in combination with a liquid dispensing apparatus or system as generally described above, as well as a method of providing pressure relief in liquid dispensing apparatus as, for example, described generally above.

The method of this invention may include directing liquid under pressure into a series of passages, directing a first stream of the liquid from the series of passages to the pressure relief inlet of the pressure relief and bypass valve, and directing a second stream of the liquid from the series of passages through the bypass inlet of the pressure relief and bypass valve at a pressure lower than the elevated pressure at which the valve member will open. Additional modifications and features of the method may be included, as will recognized, for example, from the description of the liquid dispensing apparatus given above, as well as the more detailed description given below.

From the foregoing summary and the more detailed description to follow, it will be appreciated that the invention provides substantial assurance that the pressure relief valve of a liquid dispensing system will not be easily clogged with contaminants flowing through the system and will not be plagued by other problems caused, for example, by stagnated liquid in the valve. Additional advantages and objectives of the invention will become more readily apparent of those of ordinary skill upon review of the following detailed description of a preferred embodiment, taken in conjunction with the accompanying drawings.

DETAILED DESCRIPTION OF THE PREFERRED EMBODIMENT

Figure 1:
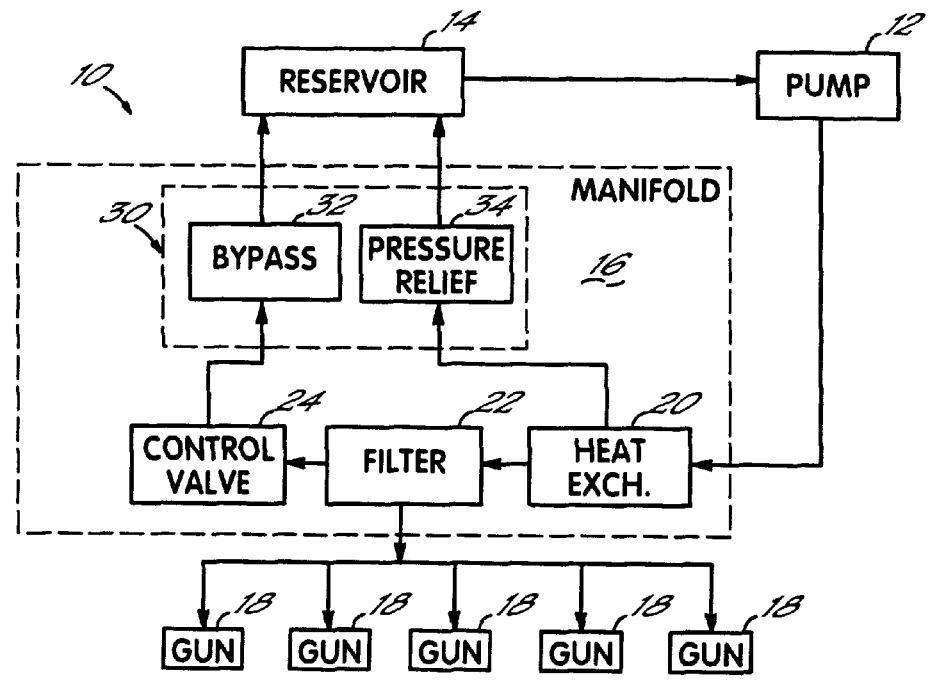
FIG. 1 is a block diagram showing a representative liquid dispensing apparatus or system incorporating a pressure relief and bypass valve of the present invention.

Referring first to FIG. 1, a liquid dispensing apparatus 10 is shown specifically adapted for dispensing a heated liquid onto a substrate in accordance with the principles of this invention. While it will be understood that any desired liquid, such as heated liquids, may be dispensed in accordance with the invention, for the sake of simplicity, the present invention will be described more specifically in connection with dispensing so-called hot melt adhesives. These adhesives are typically dispensed at about 250° F. and above. From time to time, the heated nature of these adhesives leads to charring, which creates contaminants capable of lodging within conventional pressure relief valves. The inventive principles will be described with reference to only one of many possible embodiments of dispensing apparatus and valve configurations falling within the scope of this invention, for example, especially useful in dealing with hot melt adhesive dispensing equipment. Other configurations and uses of the invention are also possible.

Still referring to FIG. 1, apparatus 10 generally includes a pump 12, which may also be coupled with additional pumps such as metering gear pumps, for drawing hot melt adhesive from a reservoir 14 and delivering the adhesive in a pressurized form to additional dispensing equipment. This hot melt adhesive is, for example, typically pumped into a manifold 16 which ultimately distributes the adhesive to a plurality of dispensing guns 18. Manifold 16 may include a heat exchanger 20 and a filter 22, in conventional manners, for respectively heating and filtering the hot melt adhesive prior to dispensing the adhesive from guns 18. A control valve 24, which may be a conventional needle valve, controls the liquid flow from manifold 16 to guns 18. Specifically, if control valve 24 is adjusted toward the closed position, more adhesive will be diverted through filter 22 to guns 18.

In accordance with the invention, and as will be discussed further below, a pressure relief and bypass valve 30 is mounted as part of manifold 16 and includes both a bypass portion 32 and a pressure relief portion 34. Bypass portion 32 can continuously receive a flow of liquid hot melt adhesive from control valve 24. Any adhesive which does not flow through control valve 24 is directed from filter 22 to the series of dispensing guns 18. Thus, as mentioned above, it will be appreciated that control valve may be gradually closed-off to a desire amount to supply additional liquid flow and pressure to guns 18 or gradually opened to a desired amount to supply additional flow and pressure to bypass portion 32 of pressure relief and bypass valve 30. If an undesirable elevated pressure condition is experienced downstream of pump 12, then pressure relief portion 34 of valve 30 will open and relieve the liquid pressure into reservoir 14. As also shown, the flow of liquid through bypass portion 32 is also preferably directed into reservoir 14.

Figure 2A:
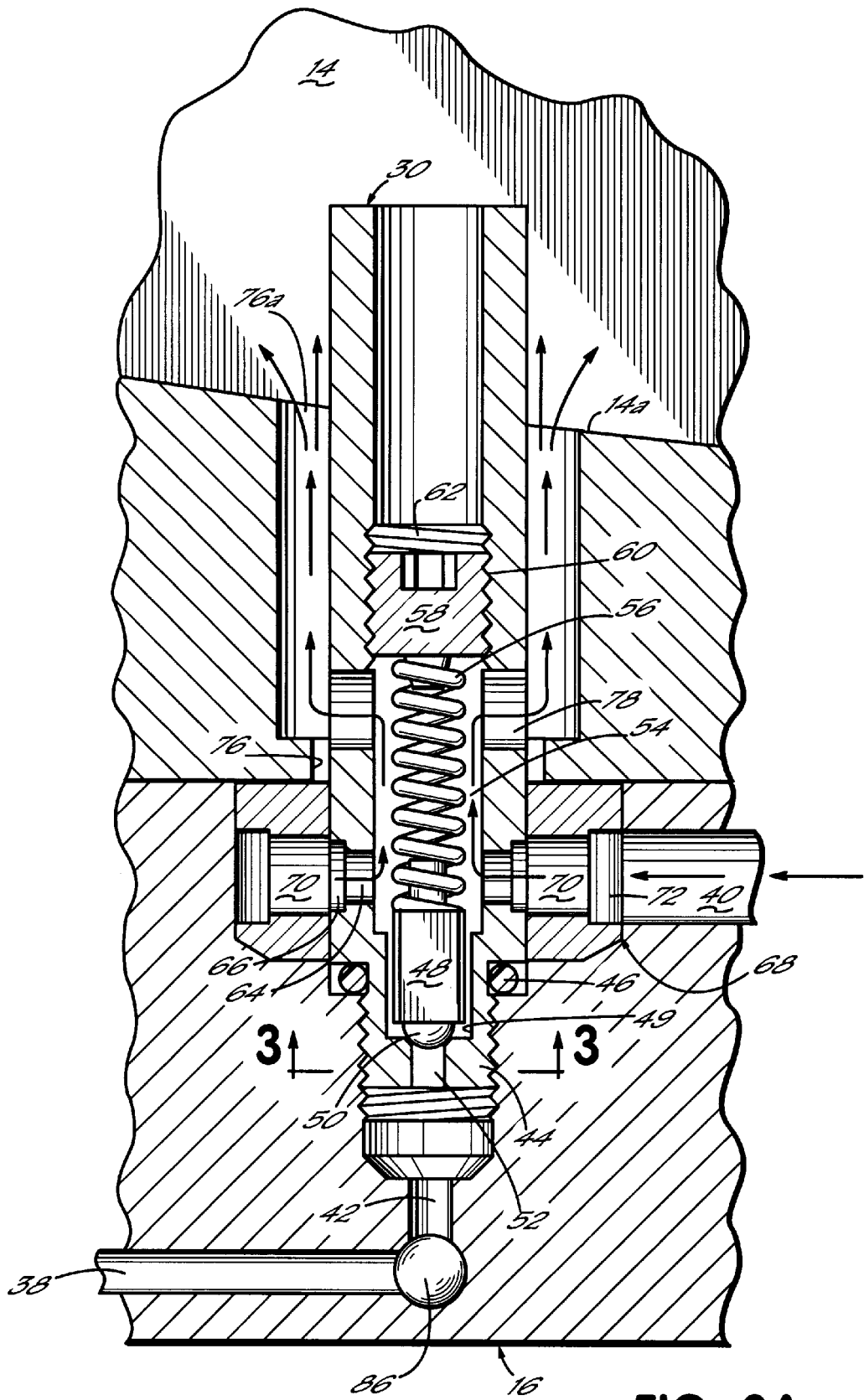
FIG. 2A is a cross sectional view of the pressure relief and bypass valve of the preferred embodiment connected generally between a liquid distributing manifold and a liquid reservoir, and showing the valve member in a closed position.

Now particularly referring to FIG. 2A, pressure relief and bypass valve 30 is mounted within manifold 16 and extends through a bottom wall 14a of liquid reservoir 14. Valve 30 is in communication with a pressurized liquid passage 38 in manifold 16. Passage 38 is filled with pressurized liquid generally traveling between pump 12 and dispensing gun 18. Valve 30 is further in communication with a passage 40 in manifold 16 for continuously supplying the liquid hot melt adhesive to achieve a flushing or cleaning function as will be appreciated from the description to follow. Valve 30 is more particularly mounted within an internally threaded passage 42 by an externally threaded portion 44. Valve 30 may have a hexagonal outer surface for engagement by a socket wrench for all assembly and disassembly with respect to manifold 16. Passage 42 communicates with passage 38 and is sealed with respect to valve 30 by an o-ring 46. Valve 30 further includes a valve member 48 having a rounded or ball-shaped end 50 that normally closes a pressure relief inlet 52 communicating with passage 42 and 38. Valve 30 has a main passage 54 with a coil spring 56 mounted between valve member 48 and a stationary stop 58. Stationary stop 58 is threaded into one end of valve 30 by external threads 60 engaging internal threads 62 of main passage 54. In this manner, stationary stop 58 is also axially adjustable to adjust the spring force exerted against valve member 48 to provide various levels of pressure relief as may be dictated by spring rate or other design considerations within the abilities of those having ordinary skill in this art.

As further shown in FIG. 2A, valve 30 includes a plurality of bypass inlets 64, which may be a pair of radially opposed inlets. An annular, external recess 66 in valve 30 allows communication between the opposed bypass inlets 64. In addition, a liquid distribution spool 68 is preferably located adjacent to the outside surface of valve 30 in a substantially leak-proof manner and includes a plurality of, for example, four radially extending passages 70 communicating with recess 66. Spool 68 generally provides a path for liquid to flow between passage 40 and main passage 54. Spool 68 is preferably circular in shape and may also include an annular, external annular recess 72 which allows liquid to travel from passage 40 into each of the radially extending passages 70 and ultimately into passages 64 and main passage 54 of valve 30. Valve 30 further extends into a bore 76 formed through bottom wall 14a of reservoir 14. This bore 76 may include a counterbore portion 76a communicating with a plurality of outlets 78 in valve 30. As also shown, valve outlets 78 communicate with main passage 54 and allow liquid to flow substantially through the entire extent of main passage 54 occupied by spring 56. Thus, as will be further appreciated from the description to follow, contaminants which would normally lodge within spring 56 may be continuously flushed by the passage of liquid adhesive from bypass inlets 64 to outlets 78.

Figure 3:
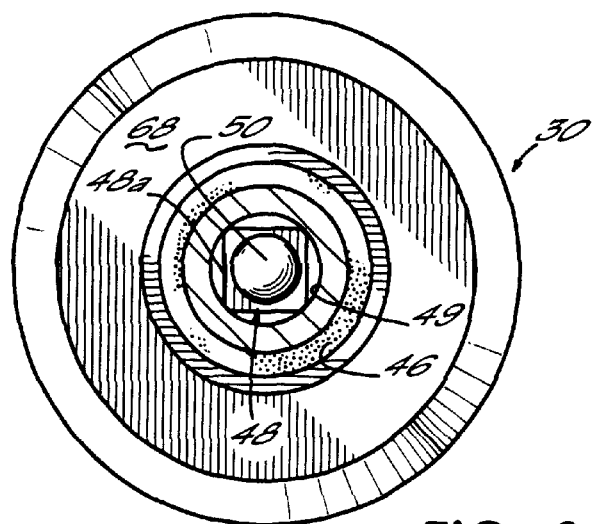
FIG. 3 is a cross sectional view taken along line 3—3 of FIG. 2A.
Figure 2B:
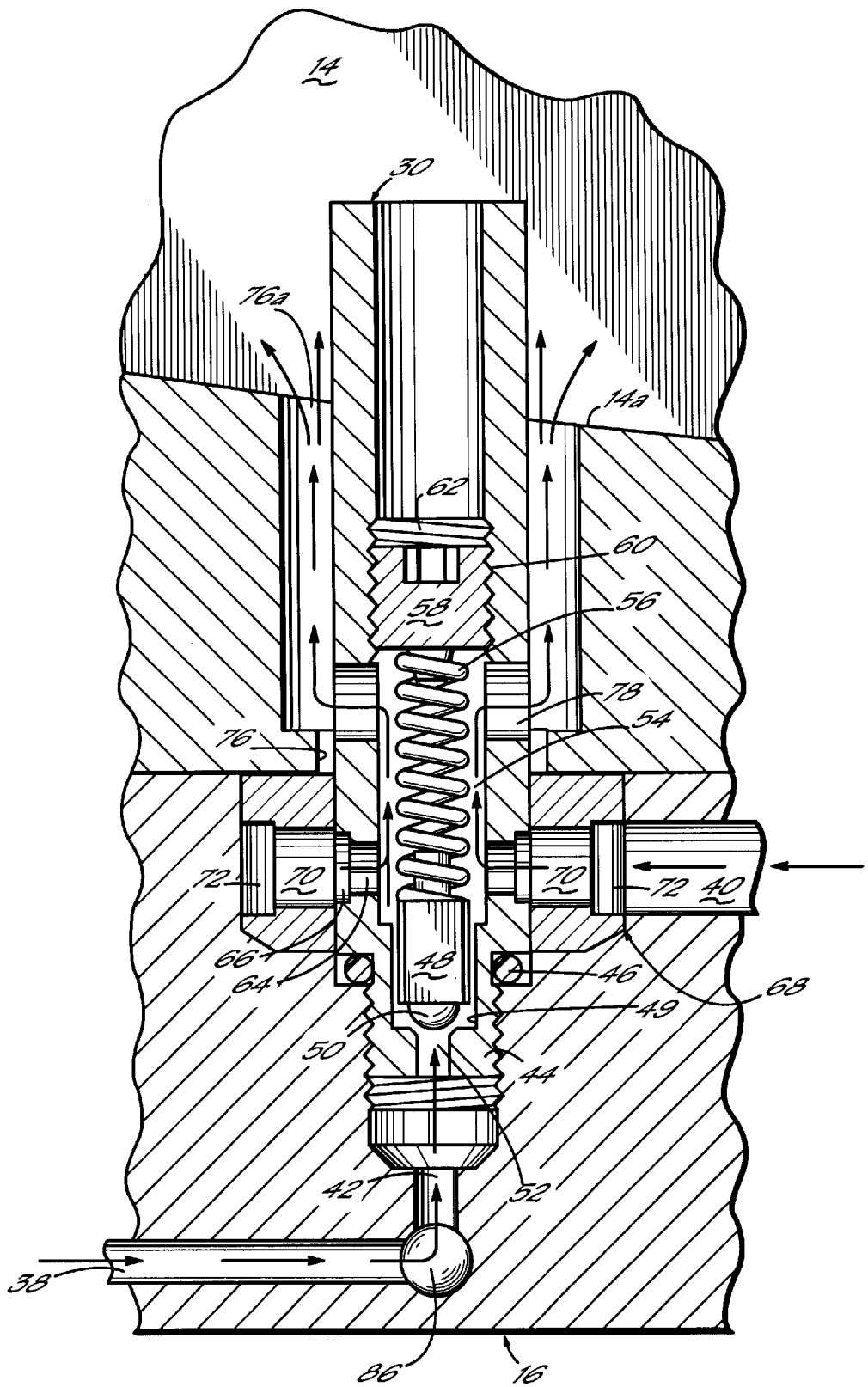
FIG. 2B is a cross sectional view similar to FIG. 2A, but showing the valve member in an open, pressure relieving position.

As shown in FIG. 2B, when an undesirable elevated liquid pressure condition exists in passage 38, valve member 48 will lift upwardly, as shown in the drawing, to allow flow through inlet 52 and into main passage 54. As long as this elevated pressure condition exists, it will be relieved by allowing flow past valve member 48, through main passage 54, outlets 78 and bore 76 into reservoir 14. FIG. 3 illustrates that this pressure relieving flow of liquid will travel past valve member 48 since valve member 48 includes flat outer surfaces 48a retained within a circular bore 49. Flow will also continue through the bypass portion of valve 30 as previously described.

Figure 4:
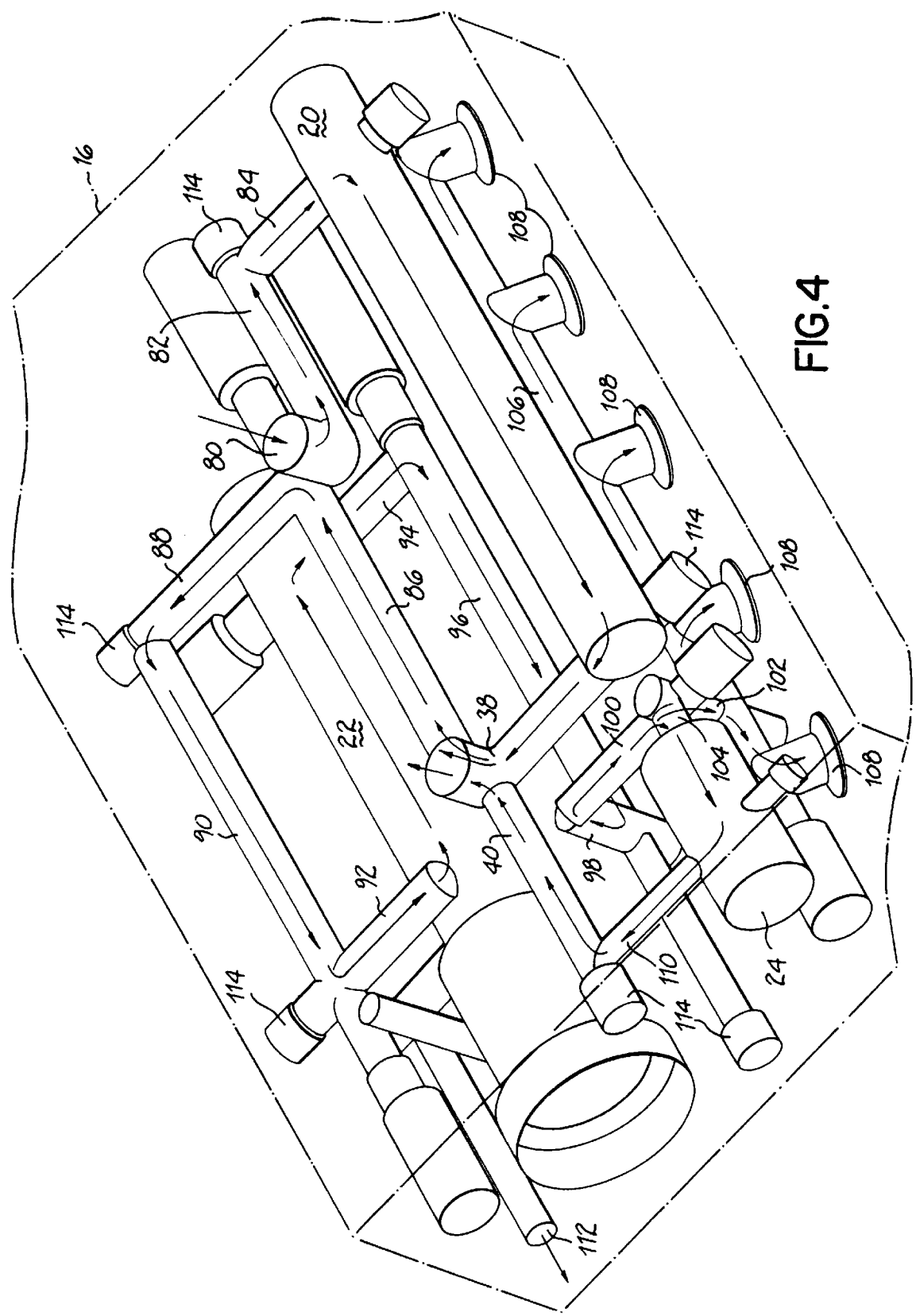
FIG. 4 is a schematic, perspective view of the liquid distributing manifold showing the internal liquid flow paths.

Referring to FIG. 4, manifold 16 is shown schematically with various internal passages and components thereof indicated by solid lines. In operation, a manifold inlet 80 will receive pressurized liquid, such as hot melt adhesive, from a pressurized supply which may include pump 12 and reservoir 14 (FIG. 1). This hot melt adhesive will travel through passages 82 and 84 into heat exchanger 20. From heat exchanger 20, the liquid adhesive will travel through passage 38 and into passage 86. As previously mentioned, passage 38 communicates with the pressure relief portion of valve 30 by way of passage 42 (FIG. 2A). In normal operation, this liquid proceeds on through passage 86, but in undesirable elevated pressure conditions, the pressure relief portion of valve 30 may be activated as previously described. From passage 86, the liquid adhesive travels on through passages 88, 90 and 92 into a liquid filter 22. From liquid filter 22, the hot melt adhesive travels through passages 94, 96, 98 and 100, at which point it splits off into passages 102 and 104 as shown. Passage 102 leads to a main supply passage 106 for supplying liquid hot melt adhesive to a plurality of distribution passages 108 which may be connected to dispensing guns 18 (FIG. 1) or other dispensing components. Passage 104 is directed into control valve 24 and, assuming control valve 24 is open, this liquid will travel into passage 110 and finally into passage 40 as described in connection with FIGS. 2A and 2B.

A filter drain 112 is also shown in FIG. 4 and is conventionally connected to a valve which may be opened to allow filter 22 to be replaced or cleaned. Also, a representative plurality of plugs 114 are shown to indicate that, as is conventional, the manifold 16 must be constructed with a plurality of drilled bores and many of these bores must be plugged to create the serpentine series of passages shown in the drawing.

While the present invention has been illustrated by a description of various preferred embodiments or features and while these embodiments and features have been described in considerable detail in order to describe the best mode of practicing the invention, it is not the intention of Applicants to restrict or in any way limit the scope of the appended claims to such detail. Additional advantages and modifications within the spirit and scope of the invention will readily appear to those skilled in the art.

The invention itself should only be defined by the appended claims, wherein we claim:

1. Liquid dispensing apparatus for dispensing pressurized liquid, the apparatus comprising:

a pump having an inlet and an outlet, a liquid reservoir having an outlet in communication with the inlet of said pump, and a pressure relief and bypass valve having a pressure relief inlet, a bypass inlet, and at least one outlet, said pressure relief inlet and said bypass inlet each being connected for liquid communication with the outlet of said pump, wherein said pressure relief inlet includes a normally-closed valve member which is movable to an open position in an elevated liquid pressure condition and said bypass inlet is open to allow liquid flow through said pressure relief and bypass valve to said outlet in order to flush said valve during normal operation of said pump.

2. The liquid dispensing apparatus of claim 1 further comprising at least one liquid dispenser connected for liquid communication with the outlet of said pump and with the pressure relief inlet of said pressure relief and bypass valve.

3. The liquid dispensing apparatus of claim 1 further comprising a manifold with a plurality of liquid outlets, wherein said pressure relief and bypass valve is mounted within said manifold and said pressure relief and bypass inlets are in liquid communication with said liquid outlets.

4. The liquid dispensing apparatus of claim 3, wherein the outlet of said pressure relief and bypass valve is in liquid communication with said reservoir.

5. The liquid dispensing apparatus of claim 4, wherein said pressure relief and bypass valve extends through a wall of said reservoir.

6. The liquid dispensing apparatus of claim 3, wherein said manifold is connected to a bottom wall of said reservoir and said pressure relief and bypass valve extends into said manifold and into said bottom wall.

7. The liquid dispensing apparatus of claim 6, wherein said bypass inlet of said pressure relief and bypass valve is located between said pressure relief inlet and said outlet.

8. The liquid dispensing apparatus of claim 1, wherein said pressure relief and bypass valve further includes a coil spring connected with said valve member and disposed in a passage of said valve communicating between said pressure relief and bypass inlets and said outlet.

9. The liquid dispensing apparatus of claim 1 further comprising a control valve operatively connected between the bypass inlet of said pressure relief and bypass valve and the outlet of said liquid dispenser, said pressure control valve being adjustable to control liquid flow through said liquid dispenser outlet relative to liquid flow into said bypass inlet.

10. The liquid dispensing apparatus of claim 1, wherein said pressure relief and bypass valve includes at least two of said bypass inlets.

11. The liquid dispensing apparatus of claim 10, wherein said pressure relief and bypass valve includes at least two of said outlets.

12. The liquid dispensing apparatus of claim 10, wherein the dispenser further comprises a manifold having a plurality of dispensing outlets and further comprising a liquid distribution spool located between said manifold and said bypass inlets, said spool having a plurality of liquid passages for distributing liquid from said manifold to said bypass inlets.

13. In a liquid dispensing apparatus for dispensing liquid at elevated pressure, a pressure relief and bypass valve comprising:

a valve body having a main passage with a pressure relief inlet, a bypass inlet, and at least one outlet, and a valve member mounted within said valve body and normally biased to a closed position to block the flow of liquid through said pressure relief inlet, said valve member being movable to an open position when an elevated liquid pressure is exerted against said valve member, and said bypass inlet being open to allow liquid flow through the main passage of said valve body in order to flush the main passage of said valve body while dispensing liquid at said elevated pressure.

14. The apparatus of claim 13, wherein the bypass inlet is located between said pressure relief inlet and said outlet.

15. The apparatus of claim 13 further comprising a coil spring coupled with said valve member and disposed in the main passage generally between said pressure relief and bypass inlets and said outlet.

16. The apparatus of claim 13 further comprising at least two of said bypass inlets communicating with said outlet.

17. The apparatus of claim 16 further comprising at least two of said outlets.

18. The apparatus of claim 13 wherein said valve member extends within said main passage along an axis, and said pressure relief inlet is disposed at one end of said valve body in substantial alignment with said axis.

19. The apparatus of claim 18, wherein said bypass inlet extends transverse to said axis at a location between said pressure relief inlet and said outlet.

20. The apparatus of claim 19 further comprising a coil spring coupled with said valve member and extending within said main passage generally between said bypass inlet and said outlet.

21. The apparatus of claim 20 further comprising a plurality of said bypass inlets extending into said valve body transversely to said axis and a spool located adjacent to said valve body and including a plurality of passages for distributing liquid to said bypass inlets.

22. The apparatus of claim 21 further comprising an annular recess in said valve body for providing a flow path between the passages in said spool and said bypass inlets.

23. The apparatus of claim 20 further comprising a plurality of said bypass inlets extending into said valve body transversely to said axis and an annular recess in an outer surface of said valve body connecting said bypass inlets for liquid communication with each other.

24. A method of providing pressure relief in liquid dispensing apparatus having a series of liquid flow passages connected with a pressure relief and bypass valve having a pressure relief inlet and a bypass inlet and communicating with at least one dispensing outlet, the method comprising:

directing liquid under pressure into the series of passages, directing a first stream of said liquid from said series of passages to the pressure relief inlet of said pressure relief and bypass valve, said pressure relief inlet being biased normally-closed and being selectively opened upon detection of an elevated pressure in said series of passages, and directing a second stream of said liquid from said series of passages through the bypass inlet of said pressure relief and bypass valve at a pressure lower than said elevated pressure.

25. The method of claim 24, wherein the liquid dispensing apparatus further comprises a pressure control valve disposed in said series of passages for fluid communication between said bypass inlet and said dispensing outlet, and the method further includes adjusting said pressure control valve to adjust the liquid pressure at the dispensing outlet relative to the liquid pressure at the bypass inlet.

26. The method of claim 24, wherein the liquid dispensing apparatus further comprises a liquid reservoir connected with a pump for pumping liquid from said liquid reservoir into said series of passages, and the method further comprises directing said first and second streams of liquid from the pressure relief inlet and bypass inlet, through the pressure relief and bypass valve, and into the reservoir.

27. The method of claim 24, wherein the pressure relief and bypass valve further includes a coil spring and a valve member connected together for biasing the pressure relief inlet normally-closed, and the method further comprises directing the second stream through the spring and through an outlet in said pressure relief and bypass valve.

28. The method of claim 24, wherein the series of passages are contained in a manifold having a plurality of said dispensing outlets.

29. The method of claim 28, wherein said manifold is connected to a wall of a reservoir for supplying said liquid to said series of passages and said pressure relief and bypass valve includes an outlet communicating with the pressure relief and bypass inlets and with the interior of said reservoir through said wall, the method further comprising directing the first and second streams through the outlet and into the reservoir.

30. A pressure relief and bypass valve adapted to be connected in fluid communication with a pump, the valve comprising:

a pressure relief inlet, a bypass inlet, and at least one outlet, said pressure relief inlet and said bypass inlet each being adapted for liquid communication with the outlet of said pump, wherein said pressure relief inlet includes a normally-closed valve member which is movable to an open position in an elevated liquid pressure condition and said bypass inlet is open to allow liquid flow through said pressure relief and bypass valve to said outlet in order to flush said valve during normal operation of said pump.

* * * * *